Aug. 9, 1960  G. A. LYON, JR  2,948,567
WHEEL COVER
Filed June 20, 1955  2 Sheets-Sheet 2
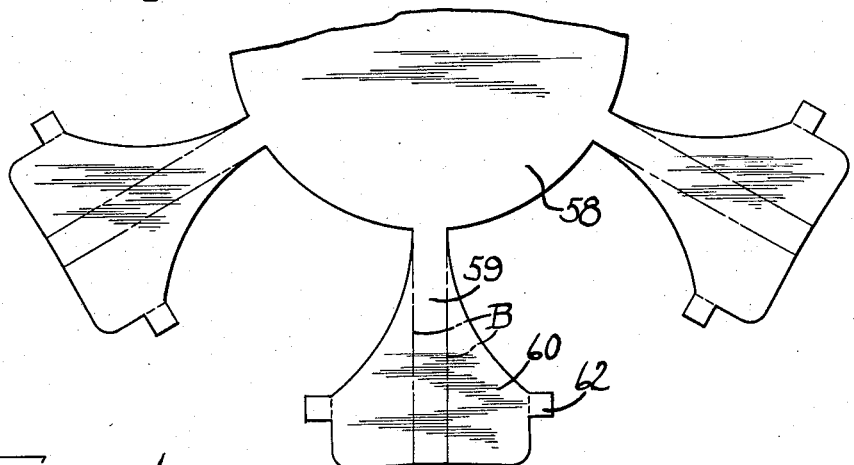
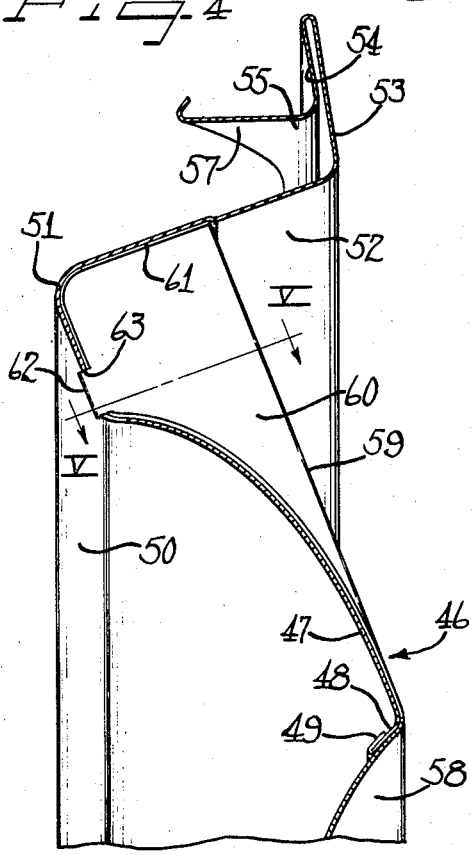
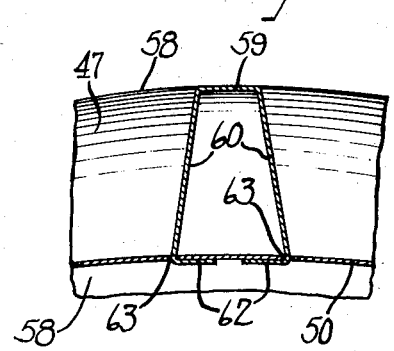
Inventor
George A. Lyon Jr.

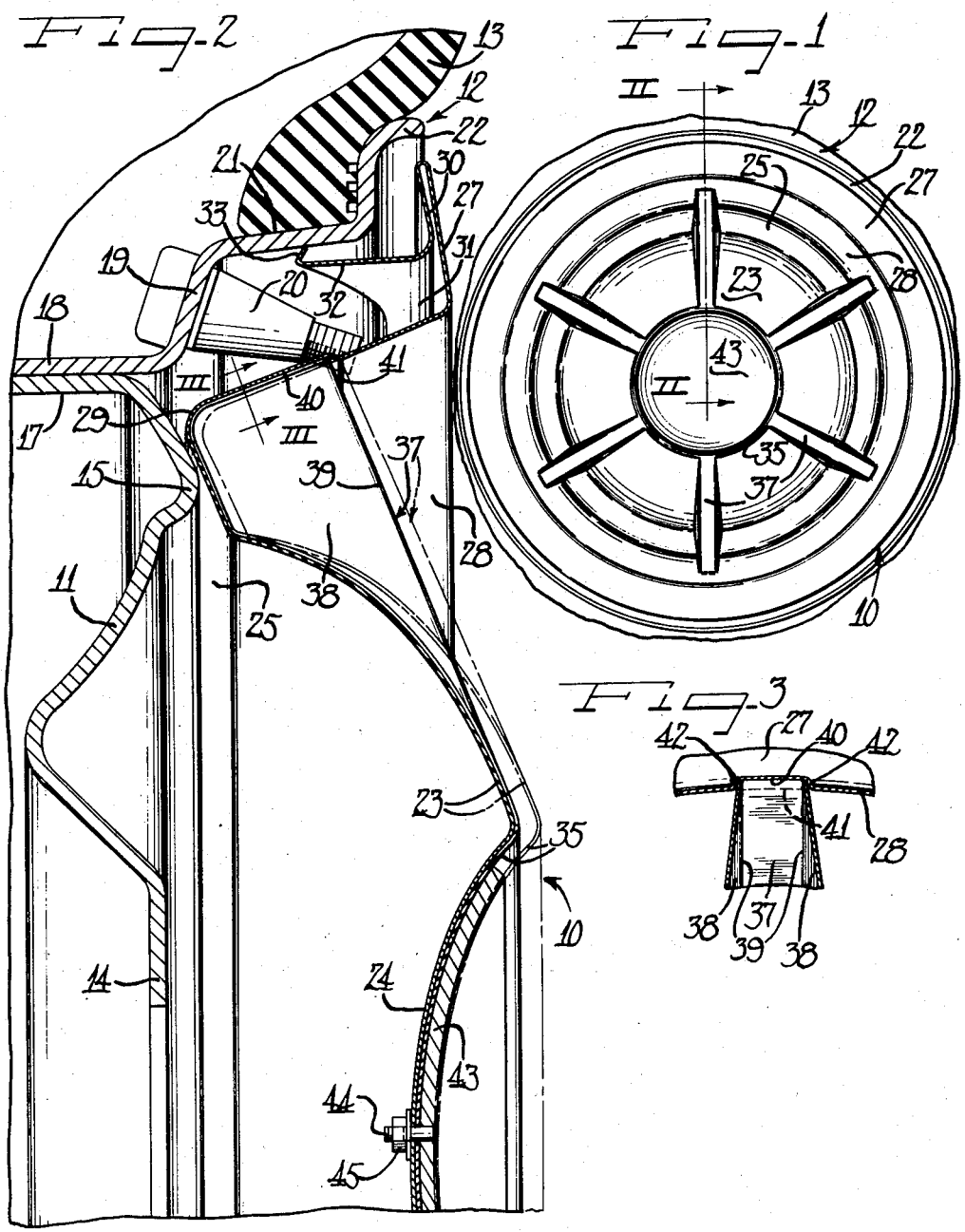

United States Patent Office 2,948,567
Patented Aug. 9, 1960

2,948,567
WHEEL COVER

George A. Lyon, Jr., Birmingham, Mich., assignor to Lyon Incorporated, Detroit, Mich., a corporation of Delaware Filed June 20, 1955, Ser. No. 516,522

10 Claims. (Cl. 301—37)

The present invention relates to improvements in wheel structures and more particularly concerns the ornamental and protective covering of the outer sides of vehicle wheels such as automobile wheels.

Where it is desirable to provide a wheel cover having a deep draw, the stretching and hardening of the sheet material places limitations upon the ornamental effect that may be attained. This is particularly true where rib-like ornamentation is desired on or across an annular deeply drawn portion of the cover.

It is accordingly an important object of the present invention to provide a wheel cover for disposition at the outer side of a vehicle wheel provided with a novel assembly affording for a cover of deeply drawn basic shape a radially ribbed or spoke-like appearance.

Another object of the invention is to provide in a cover having a deeply drawn ornamental appearance an arrangement of spoke-like ornamental features applied thereto but affording the appearance of having been drawn integrally in the basic or main body portion of the cover.

A further object of the invention is to provide a novel economical cover assembly wherein separately formed cover components cooperate for mutual reinforcement and to afford an unusual combined ornamental affect.

Yet another object of the invention is to provide a novel cover assembly in which the components are constructed and arranged for simple, easy and economical assembly.

Other objects, features and advantages of the present invention will become readily apparent from the following detailed description of certain preferred embodiments thereof taken in conjunction with the accompanying drawings, in which Figure 1 is an outer side elevational view of a wheel structure embodying features of the invention Figure 2 in an enlarged radial sectional view taken substantially on the line II—II of Figure 1

Figure 3 is a fragmentary detail sectional view taken substantially on the line III—III of Figure 2;

Figure 4 is a radial sectional view through a modified form of the cover

Figure 5 is a fragmentary radial sectional detail view taken substantially on the line V—V of Figure 4; and Figure 6 is a fragmentary plan view of a blank stamped in the flat for making the spoke arm crown piece for the cover of Figure 4.

Having reference to Figures 1, 2 and 3, a wheel cover 10 is constructed and arranged for disposition on the outer side of a vehicle wheel including a disk spider wheel body 11 and a tire rim 12 which is of the drop center multi-flange type arranged to support a pneumatic tire 13 which may be of the tubeless type or which may be a tire and tube assembly. The wheel body 11 has a central bolt on flange 14 from which the wheel body recedes axially inwardly and then extends generally radially and axially outwardly to an annular outer marginal reinforcing portion 15 from which extends axially inwardly an attachment flange 17 attached to a base flange 18 of the tire rim. An outer side flange 19 on the tire rim supports a valve stem 20 and leads into an intermediate generally axially outwardly extending and radially outwardly sloping intermediate flange 21 merging with a generally radially outwardly and then axially outwardly turned terminal flange 22. It will be observed that the wheel has the body portion 11 thereof substantially inset relative to the outer tire rim flanges.

In view of the substantially inset relationship of the wheel body 11 to the tire rim 12, the wheel will accommodate a cover of substantially deep draw formation. To this end, the wheel cover 10 comprises a cover disk of sheet material such as stainless steel, brass, or the like adapted for drawing in suitable press equipment and susceptible of a desirable ornamental finish such as polishing or burnishing and plating. In the present instance the cover disk includes a central crown portion 23 of circular form and a diameter to substantially overlie the central portion of the wheel body 11 to adjacent the annular marginal bulge portion 15. Centrally the crown portion 23 may be concavely inset or dished as at 24. In overlying relation to the marginal bulge portion 15 of the wheel is an annular preferably substantially frusto-conical and generally radially outwardly and axially inwardly sloping deeply inset intermediate cover portion 25 leading from the outermost inwardly directed extremity of the crown 23 and adapted in assembly of the cover on the wheel to bottom against the wheel body portion 15.

Enchancing the deep drawn annular inset intermediate form of the cover 10 is an annular outer marginal tire rim covering portion 27 of the cover which is offset substantially axially outwardly relative to the intermediate inset cover portion 25 and joined thereto by a generally radially and axially inwardly oblique annular, and in the present instance generally frusto-conical flange portion 28 joining the intermediate cover portion 25 on a radius juncture 29. The marginal cover portion 27 extends generally radially outwardly and axially inwardly toward but short of the tip or extremity of the terminal flange 22 for overlying the terminal flange in spaced relation to accommodate wheel balancing weights or the like therebehind. In addition, the marginal cover portion 27 carries therebehind cover retaining means in the present instance comprising an underturned generally radially inwardly directed annular flange 30 having an annular generally axially inwardly extending portion 31 from which extends a series of integral cover retaining fingers 32 having short terminal gripping flanges 33 turned generally radially and axially outwardly and engageable under resilient gripping tension against the intermediate flange 21 for retaining the cover on the wheel. There may be a series of 8 to 16 of the retaining fingers 32, as preferred.

Application of the cover 10 to the outer side of the wheel is accomplished by generally centering the cover relative to the wheel and pressing the same generally axially inwardly until the retaining fingers 32 have entered into effective retaining engagement with the rim flange 21, and the intermediate cover portion 25 has bottomed against the wheel body portion 15. It will be observed that the valve stem 20 is accommodated within the substantial chamber provided behind the annular outer cover portion 27. Means for removing the cover, such as a pry off tool may be inserted behind the outer multi-layer reinforced extremity of the cover provided by the underturned flange 30 and the marginal cover portion 27 and pry-off leverage applied thereto for releasing the retaining fingers 32 from gripping engagement with the tire rim.

In order to afford an ornamental spoke-like appearance for the outer side of the cover 10 in a manner that will afford the illusion that the spoke ornamentation has been drawn directly in the cover plate, and for reinforcing the cover plate, a second cover member 35 is provided which is constructed and arranged for nested interengagement with the main cover plate. To this end, the second cover member is provided in the form of a central circular disk which is preferably of a concave convex formation and of a complementary diameter to nest in the dished or depressed central portion 24 of the cover crown. Extending radially from the disk 35 and preferably integral in one piece therewith is a series of circumferentially spaced spoke extensions 37 which are shown herein as 6 in number but may be more or less in number, as preferred.

Each of the ribs 37 may be provided with a straight flat narrow ridge with divergently extending side flanges 38 joining the ridge on short radius longitudinally reinforcing rib juncture bends 39. Thereby the spoke like extensions 37 are of substantial stiffness to resist deformation. At their edges the wing-like side flanges 38 are shaped complementary to the underlying side of the cover crown 23, the inset intermediate cover portion 25 and the outer marginal flange portion 28, so that the spoke side flanges 38 will closely fit the engaged cover surfaces.

In order to effect an intercolcked mutually reinforcing interengagement of the spoke extensions 37 and the cover flange portion 28, the outer extremity or tip portions of the spoke extensions inclusive of the side flanges 38 thereof are of a length to fit into pockets or sockets 40 recessed by suitable embossment in the axially inner portion of the cover flange 28 and into the juncture radius 29. This provides at the axially outer sides of the sockets 40 an overhanging interlock wall portion 41 and at the respective opposite circumferentially spaced sides respective side interlock shoulders 42. Thereby, the rib-like spoke extensions 37 are retained within the recessed sockets 40 against axially outward displacement by the overhanging shoulder 41, and against lateral displacement by the side shoulders 42. Since the side flanges 38 of the spoke extensions are thereby held against spreading laterally the side flanges will retain the spokes against axially inward displacement relative to the cover plate in response to pressure against the crests or ridges of the spokes.

Assembly of the spoke extensions 37 within the sockets 40 may conveniently be effected by having the spoke extensions 37 angled further axially inwardly initially than in the final assembly condition thereof so that the tips of the spoke extensions will lie on a slightly smaller diameter sufficient to clear the overhanging shoulders 41 of the spoke sockets. Accordingly, in order to effect assembly of the spoke disk member 35, it is initially placed into preliminary assembly with the main or basic cover disk substantially as shown in dot-dash outline in Fig. 2. In this initial assembled position the side flanges 38 of the spoke extensions engage at their inner corners against the sloping axially inner portion of the crown side wall. Since the side flanges 38 of the spoke extensions gradually diminish to merger with the ridge portions of the spoke extensions adjacent juncture thereof with the spoke disk 35, such juncture will be easily resiliently deflectable so that the spoke extensions can rock pivotally as such juncture. Accordingly, as the disk 35 is drawn or pressed axially inwardly into nested bottomed engagement within the concave center crown portion 24, the edges of the spoke side flanges 38 engaging the crown side wall will cam axially and radially outwardly while the radially inner junctures of the spoke extensions yield resiliently, and the outer extremity portions of the spoke extensions aligned with the sockets 40 will thus be directed into interlocked relation within the sockets.

Suitable means for securing the central disk 35 within the crown cavity portion 24 may comprise a concave convex medallion disk member 43 by which the spoke disk member 35 is clamped against the cover crown portion 24. Means such as a stud 44 carried by the medallion 43 may extend through suitable aligned central apertures in the cover members, with a nut 45 threaded on the stud securing the parts together.

In the modified construction shown in Figures 4, 5 and 6, a cover 46 is adapted to be applied to the outer side of a wheel substantially the same as the wheel in Fig. 2. In this modified form, the cover includes a main or basic cover disk of circular construction including a crown portion 47 having a central opening defined by a narrow generally axially and radially inwardly directed annular flange 48 having a turned reinforcing and finishing extremity 49. At its radially outer extremity the crown 47 merges with an annular intermediate generally frusto-conically radially outwardly and axially inwardly oblique intermediate inwardly dished or inset cover portion 50 with which merges on a radius juncture 51 a generally axially outwardly and radially outwardly oblique outer annular cover flange portion 52 of an outer marginal annular cover portion 53. An underturned flange 54 has an axially inward extension 55 provided with a plurality of axially inward retaining finger extensions 57.

Assembled with the cover plate is a spoke extension cover part or component 58 of circular dished form for nesting on the inturned crown flange 48 and closing the central opening in the crown. Projecting radially outwardly and axially inwardly from the edge of the disk 58 is a series of spoke like extensions 59 having side wall flanges 60 and in general of similar construction and configuration as the spoke like extensions 37 of the cover 10. At their outer extremities the spoke extensions 59 extend into indented interlock sockets 61 in the axially inner portion of the cover flange 52.

For securing the spoke disk 58 and the spoke extensions 59 to the cover disk, tab extensions 62 are provided on the axially inner edges of the side wing flanges 60 of a spoke extension and arranged to project through suitable slots 63 in the cover intermediate portion 50, with the tabs bent over into locking retaining engagement behind the cover portion 50. Assembly of the spoke disk 58 and the spoke extensions 59 thereof with the cover disk may be effected similarly as described in connection to the cover 10 except, of course, that the spoke disk component will be held on the cover 45 by means of the clenched tabs 62.

As shown in Fig. 6, the spoke disk cover member 58 with the spoke extensions may be stamped from a sheet metal piece in flat state and the side wing flange portions 60 of the spoke extensions then bent into the divergent angular relation to the ridges of the spoke extensions, along bend lines, and the disk portion 58 drawn into concave convex condition. In the flat state the spoke disk cover portion 58 may be polished and plated, or at least polished so that plating can be accomplished after the formation of the central disk and spoke extension portions of the member.

It will be understood that modifications and variations may be effected without departing from the scope of the novel concepts of the present invention.

I claim as my invention:

1. In a wheel structure including tire rim and body parts, a cover for disposition at the outer side of the wheel including a circular cover member having an intermediate inset annular portion for overlying the wheel body part and a radially outer annular marginal portion for overlying the tire rim and having cover retaining means thereon engageable with the tire rim, said intermediate cover portion having a plurality of ornamental and reinforcing spoke like ribs extending thereacross, said reinforcing rib spokes comprising substantially rigid spoke extensions from a member overlying the crown of the cover and provided with flanges in tensioned reinforcing engagement with the walls of the cover defining the annular inset portion thereof.

2. In a cover for disposition at the outer side of a vehicle wheel, a circular cover member having an inner portion and a radially outer portion with an inwardly indented annular intermediate portion, and a spider-like cover component overlying said inner cover portion and having a series of generally radially extending spoke extensions secured in position across said intermediate cover portion, said overlying cover component comprising a central disk with the spoke extensions emanating from the edge of the disk.

3. In a cover for disposition at the outer side of a vehicle wheel, a circular cover member having an inner portion and a radially outer portion with an inwardly indented annular intermediate portion, and a spider-like cover component overlying said inner cover portion and having a series of generally radially extending spoke extensions secured in position across said intermediate cover portion, said overlying cover component comprising a central disk with the spoke extensions emanating from the edge of the disk, said disk being secured to the inner cover portion.

4. In a cover for disposition at the outer side of a vehicle wheel, a circular cover member having radially inner and outer divergently related cover portions with an intermediate portion, a second cover member overlying the inner cover portion and having a series of rib extensions therefrom provided with side flanges conforming to and closely engaging the inner cover portion and the intermediate cover portion as well as the adjacent part of the outer cover portion.

5. In a cover for disposition at the outer side of a vehicle wheel, a circular cover member having radially inner and outer divergently related cover portions with an intermediate portion, a second cover member overlying the inner cover portion and having a series of rib extensions therefrom provided with side flanges conforming to and closely engaging the inner cover portion and the intermediate cover portion as well as the adjacent part of the outer cover portion, said engaged part of the outer cover portion having retaining sockets therein within which the ends of the spoke extensions are interlocked.

6. In an assembly including a spider-like cover member having a central portion and a plurality of rib like spokes radiating therefrom and a circular cover member having an intermediate annular generally dished inset portion defined at the radially inner side by a sloping surface and at the radially outer side by a generally radially inwardly facing surface provided with inset sockets in the axially inner portion thereof, the spokes being directed axially inwardly and radially outwardly on said radially inner surface and the spider-like cover member being worked axially inwardly toward said second mentioned cover member and with the tip portions of the spokes aligned with said sockets and engaged within said sockets, and means securing the spider-like cover member against axially outward displacement.

7. In a cover for disposition at the outer side of a vehicle wheel, a central cover portion and a radially outer cover portion, said portions being generally divergently related and joined together, and a cover component engageable with one of said cover portions and having a plurality of generally radially extending spoke rib extensions therefrom having generally axially inwardly directed side wing flanges, said spoke ribs extending between and engaging both of said cover portions and the juncture portion therebetween and having the side wing flanges disposed to appear as though emanating from or comprising parts of the cover portions and said juncture portion.

8. In a cover for disposition over the outer side of a vehicle wheel, a circular cover member having means for attaching the cover to the outer side of the wheel and including radially inner and outer portions, said outer portion having a generally radially inwardly facing annular area thereof provided with a plurality of radially inwardly opening sockets, and a spider member assembled over the radially inner cover portion and having projecting generally radially outwardly therefrom a plurality of circumferentially spaced spoke portions with the radially outer extremities of the spoke portions engaged within said sockets.

9. In a cover for disposition over the outer side of a vehicle wheel, a circular cover member having means for attaching the cover to the outer side of the wheel and including radially inner and outer portions, said outer portion having a generally radially inwardly facing annular area thereof provided with a plurality of radially inwardly opening sockets, and a spider member assembled over the radially inner cover portion and having projecting generally radially outwardly therefrom a plurality of circumferentially spaced spoke portions with the radially outer extremities of the spoke portions engaged within said sockets, said spider member comprising a sheet metal disk and a medallion disk member clamping said spider disk to the radially inner cover portion.

10. In a cover for disposition over the outer side of a vehicle wheel, a one-piece sheet metal cover member having radially inner circular and radially outer annular portions, and an ornamental and reinforcing one-piece spider-like member having a central body portion overlying the radially inner cover portion and a plurality of generally radially outwardly extending symmetrically circumferentially spaced spoke-like extensions emanating from said body portion in divergent relation to one another about the body portion, said radially outer cover portion and the radially outer end portions of the spoke-like extensions having interengaging means retaining the spoke-like extensions in place.

References Cited in the file of this patent

UNITED STATES PATENTS

| | | |
|---|---|---|
| 2,276,405 | Lyon | Mar. 17, 1942 |
| 2,329,945 | Schatzman | Sept. 21, 1943 |
| 2,676,850 | McLeod | Apr. 27, 1954 |
| 2,709,114 | Plotkin | May 24, 1955 |
| 2,713,512 | Lyon | July 19, 1955 |
| 2,713,518 | Lyon | July 19, 1955 |
| 2,719,757 | Gaylord | Oct. 4, 1955 |